United States Patent
Hayata et al.

(10) Patent No.: US 7,504,452 B2
(45) Date of Patent: *Mar. 17, 2009

(54) POLYCARBONATE RESIN COMPOSITION AND MOLDED ARTICLE

(75) Inventors: Yusuke Hayata, Ichihara (JP); Akio Nodera, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 10/593,491

(22) PCT Filed: Apr. 26, 2005

(86) PCT No.: PCT/JP2005/007869

§ 371 (c)(1),
(2), (4) Date: Sep. 20, 2006

(87) PCT Pub. No.: WO2005/108489

PCT Pub. Date: Nov. 17, 2005

(65) Prior Publication Data

US 2007/0197740 A1    Aug. 23, 2007

(30) Foreign Application Priority Data

May 11, 2004    (JP) .............................. 2004-140839

(51) Int. Cl.
*C08K 5/02* (2006.01)
*C08L 69/00* (2006.01)
*C08F 20/26* (2006.01)

(52) U.S. Cl. .................. 524/462; 524/537; 525/439; 525/446

(58) Field of Classification Search ................ 524/462; 525/92 E

See application file for complete search history.

(56) References Cited

U.S. PATENT DOCUMENTS

| | | | |
|---|---|---|---|
| 6,359,073 B1 * | 3/2002 | Babb et al. .................. | 525/194 |
| 2005/0043481 A1 * | 2/2005 | Gref et al. .................. | 525/54.2 |
| 2005/0137310 A1 * | 6/2005 | Gupta et al. ................. | 524/445 |
| 2008/0051508 A1 * | 2/2008 | Hayata et al. ................ | 525/68 |

FOREIGN PATENT DOCUMENTS

| | | |
|---|---|---|
| JP | 2003 246986 | 9/2003 |
| JP | 2005 48066 | 2/2005 |

* cited by examiner

*Primary Examiner*—Tae H Yoon
(74) *Attorney, Agent, or Firm*—Oblon, Spivak, McClelland, Maier & Neustadt, P.C.

(57) ABSTRACT

This invention relates to a polycarbonate resin composition comprising: (A) 100 mass parts of a polycarbonate, comprising (a-1) 10-100% by mass of a polycarbonate-polyorganosiloxane copolymer and (a-2) 90-0% by mass of an aromatic polycarbonate (a-2); and (B) 5-100 mass parts of a fatty acid polyester, and improves the flame retardancy of the polycarbonate resin composition without using halogen flame retardants and, further, achieves high fluidity of the resin composition.

19 Claims, No Drawings

POLYCARBONATE RESIN COMPOSITION AND MOLDED ARTICLE

TECHNICAL FIELD

The present invention relates to a polycarbonate resin composition and, more specifically, to a flame retardant polycarbonate resin composition with high fluidity and an excellent balance with flame retardancy.

Further, this flame retardant polycarbonate resin composition can be used in the field of electric and electronic equipment including office automation equipment, information and communication equipment and electric home appliances, and in the fields of automotive and construction.

BACKGROUND ART

A polycarbonate/polyester alloy has good heat and chemical resistance characteristics and has been often used especially for automotive parts.

In recent years more thin-walled parts have been required from the viewpoint of weight saving, which in turn has led to the request for the improvement of fluidity of materials.

In addition to the characteristics above, the polycarbonate/polylactic acid alloy which is a polycarbonate/polyester alloy is effective for the high fluidization of polycarbonate due to the high fluidity of polylactic acid.

Since it is thought that polylactic acid produces less toxic gases when it is burned with polycarbonate in alloy due to chemical construction thereof, it is also expected that the polycarbonate alloy is excellent for environment.

Although the conventional polycarbonate/polyester alloys have good heat and chemical resistance characteristics, they have poor fluidities. In order to obtain a high fluidity of the polycarbonate, an alloy with styrene resin or a plasticizer is generally added (Patent Document 1).

Although polycarbonate/polylactic acid alloys with a luster of pearl, excellent fluidity, and good thermal and mechanical characteristics are known, further improvement of fluidity is necessary for molded articles with complicated shapes such as those of office automation equipment (Patent Document 2).

Polycarbonate resins have a self-extinguishing characteristic, however, there are fields which require a more severe flame retardancy in the field of electric and electronic equipment including office automation equipment, information and communication equipment and electric home appliances and such a characteristic has been improved by adding various flame retardants.

As a technique of improving the flame retardancy of polycarbonate resins, a halogen flame retardant such as halogenated bisphenol-A and halogenated polycarbonate oligomer has been used in combination with a flame retardant assistant such as antimony oxide from the viewpoint of flame retardant efficiency.

In recent years, however, the market demands flame retarding methods using flame retardants which do not contain halogens from the viewpoint of safety and effects on the environment after disposal and incineration.

Organic phosphorus flame retardants, especially polycarbonate resin compositions containing organophosphate ester compounds, have the action of plasticizer as well as excellent flame retardancy as such non-halogen flame retardants and many methods for them were proposed.

Additionally, a flame retardant resin composition in which a polycarbonate-polyorganosiloxane copolymer is used as a polycarbonate resin and which is made of a polycarbonate resin composition containing polytetrafluoroethylene with a fibril-forming ability is also know (Patent Document 3).

This composition shows excellent flame retardancy when the content of polyorganosiloxane is limited to a specific low range.

Although methods that use organic alkali metal salt, organic alkaline earth metal salt, or polyorganosiloxane to improve flame retardancy without compromising transparency are also known (Patent Document 4), all the methods require further improvement of fluidity.

The use of styrene resins or aromatic polyester resins to improve the fluidity of polycarbonate resin is known (Patent Document 5), but there is no description of a high-flow flame retardant polycarbonate resin using a fatty acid polyester or even polycarbonate-polyorganosiloxane copolymer.

Patent Document 1: JP-B-H07(1995)-68445
Patent Document 2: JP-A-H07(1995)-109413
Patent Document 3: JP-A-H08(1996)-81620
Patent Document 4: JP-A-H08(1996)-176425
Patent Document 5: J-A-2003-147188

DISCLOSURE OF INVENTION

The object of the present invention is to improve the flame retardancy of a polycarbonate resin composition without using halogen flame retardants and, further, to achieve high fluidity of the polycarbonate resin composition.

The present inventors have made an earnest study on the above object and, as a result, have found that it is possible to achieve the above-defined object with a polycarbonate resin composition which contains a specific polycarbonate-polyorganosiloxane copolymer, aromatic polycarbonate and fatty acid polyester, and an inorganic filler, flame retardant and fluorocarbon resin as needed, in a prescribed rate, and have arrived at the completion of the present invention.

That is, the present invention provides the following:

1. A polycarbonate resin composition comprising: (A) 100 mass parts of a polycarbonate, comprising (a-1) 10-100% by mass of a polycarbonate-polyorganosiloxane copolymer and (a-2) 90-0% by mass of an aromatic polycarbonate and (B) 5-100 mass parts of a fatty acid polyester.

2. The polycarbonate resin composition as defined in 1 above in which the viscosity-average molecular weight of the component (A) is within a range of 10,000-40,000.

3. The polycarbonate resin composition as defined in 1 or 2 in which the polyorganosiloxane segment of the polycarbonate-polyorganosiloxane copolymer (a-1) is a polydimethylsiloxane.

4. The polycarbonate resin composition as defined in 1 above in which the fatty acid polyester as the component (B) is a polylactic acid or a copolymer of hydroxycarboxylic acid and lactic acid.

5. The polycarbonate resin composition as defined in 1 above in which (C) an amount of equal to or less than 40 mass parts of an inorganic filler is added to 100 mass parts of the component (A).

6. The polycarbonate resin composition as defined in 1 above in which (D) an amount of equal to or less than 15 mass parts of a flame retardant is added to 100 mass parts of the component (A).

7. The polycarbonate resin composition as defined in 1 above in which (E) an amount of equal to or less than 5 mass parts of a fluorocarbon resin is added to 100 mass parts of the component (A).

8. The polycarbonate resin composition as defined in 1 above in which the resin is used for office automation equipment, information and communication equipment, or electric home appliances.

9. A molded article comprising a polycarbonate resin composition as defined in 1 above.

A high fluidity of a polycarbonate resin composition can be achieved by adding a fatty acid polyester and, at the same time, a high flame retardancy of the composition can also be obtained by using a polycarbonate-polyorganosiloxane copolymer.

BEST MODE FOR CARRYING OUT THE INVENTION

The following is the detailed description of the present invention.

In the polycarbonate resin composition according to the present invention, a polycarbonate-polyorganosiloxane copolymer (a-1) as a component of the polycarbonate of component (A) has a terminal group presented by the general formula (1):

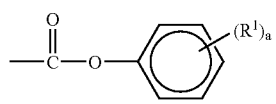

(In the formula (1), $R^1$ represents an alkyl group having 1 to 35 carbon atoms and the symbol a is an integer of 0 to 5.) Examples of such an alkyl group include, for example, the copolymers disclosed in JP-A-S50(1975)-29695, JP-A-H03(1991)-292359, JP-A-H04(1992)-202465, JP-A-H08(1996)-81620, JP-A-H08(1996)-302178 and JP-A-H10(1998)-7897, and the alkyl group having 1 to 35 carbon atoms may have a straight chain or branched structure and a bonding position thereof may be p-, m-, or o-position, but p-position is preferable.

An example of such a polycarbonate-polyorganosiloxane copolymer is preferably a copolymer having a polycarbonate part with a structural unit represented by the general formula (2) and a polyorganosiloxane part (segment) with a structural unit represented by the general formula (3) within a molecule:

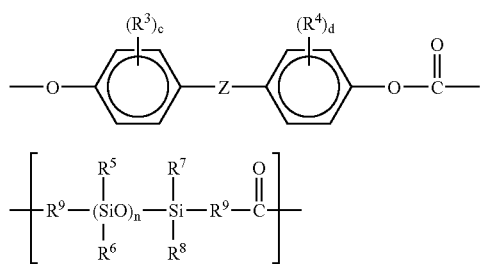

Where, $R^3$ and $R^4$ represent an alkyl or phenyl group having 1 to 6 carbon atoms and they may be the same with or different from each other.

$R^5$ to $R^8$ represent an alkyl or phenyl group having 1 to 6 carbon atoms and are preferably methyl group, and they may be the same with or different from each other.

$R^9$ represents a divalent organic residue containing an aliphatic or aromatic group, preferably an o-allylphenol, p-hydroxystyrene or eugenol residue.

The symbol Z represents a single bond, an alkylene group having 1 to 20 carbon atoms, an alkylidene group having 1 to 20 carbon atoms, a cycloalkylene group having 5 to 20 carbon atoms, a cycloalkylidene group having 5 to 20 carbon atoms, or a bond of —$SO_2$—, —SO—, —S—, —O— or —CO—. Preferably, Z is an isopropylidene group. The symbols c and d represent an integer of 0 to 4, preferably 0, and n is an integer of 1 to 500, preferably 5 to 200.

The polycarbonate-polyorganosiloxane copolymer may be produced by, for example, dissolving a previously prepared polycarbonate oligomer (hereinafter referred to as PC oligomer), which constitutes the polycarbonate part, and a polyorganosiloxane (reactive PORS), which has a reactive group, such as an o-allylphenol group, a p-hydroxystyrene group or an eugenol residue, at a terminus thereof, which constitutes the polyorganosiloxane part (segment), in a solvent such as methylene chloride, chlorobenzene or chloroform, the resulting solution being, after having been added with an aqueous caustic alkali solution of a dihydric phenol, subjected to an interfacial polycondensation reaction using a tertiary amine (triethylamine, etc.) or a quaternary ammonium salt (trimethylbenzylammonium chloride, etc.) as a catalyst in the presence of an general terminating agent including a phenol compound represented by the following general formula (4):

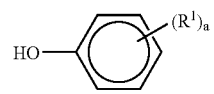

(In the formula (4), $R^1$ and the symbol a have the same meanings as those in the general formula (1))

As the above terminating agent, there may be specifically mentioned phenol, p-cresol, p-tert-butylphenol, p-tert-octylphenol, p-cumylphenol, p-nonylphenol, docosylphenol, tetracosylphenol, hexacosylphenol, octacosylphenol, triacontylphenol, dotriacontylphenol and tetratriacontylphenol, for example.

These terminating agents may be used singly or in combination with two or more thereof.

These phenol compounds may be used in combination with other phenol compounds, etc. to the extent that the effect of the original compound(s) will not be diminished.

The PC oligomer used for the preparation of the polycarbonate-polyorganosiloxane copolymer may be easily produced by reacting a dihydric phenol represented by the following general formula (5) with a carbonate precursor, such as phosgene or a carbonic ester compound, in a solvent, such as methylene chloride:

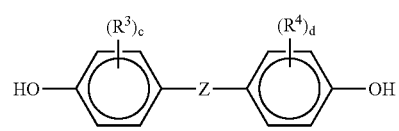

(In the formula (5), $R^3$, $R^4$, Z, and the symbols c and d have the same meanings as those in the general formula (2))

Namely, the oligomer may be produced, for example, by a reaction of a dihydric phenol with a carbonate precursor such as phosgene or by an ester exchange reaction of a dihydric phenol with a carbonate precursor such as diphenyl carbonate, in a solvent such as methylene chloride.

As the dihydric phenol represented by the general formula (5), there may be mentioned 4,4'-dihydroxydiphenyl; bis(4-hydroxyphenyl)alkanes such as 1,1-bis(4-hydroxyphenyl) methane, 1,1-bis(4-hydroxyphenyl)ethane and 2,2-bis(4-hydroxyphenyl)propane; bis(4-hydroxyphenyl)cycloalkanes; bis(4-hydroxyphenyl)oxide; bis(4-hydroxyphenyl)sulfide; bis(4-hydroxyphenyl)sulfone; bis(4-hydroxyphenyl)sulfoxide; bis(4-hydroxyphenyl)ether; and bis(4-hydroxyphenyl) ketone.

Above all, 2,2-bis(4-hydroxyphenyl)propane (bisphenol A) is preferable.

These dihydric phenols may be used singly or in combination of two or more thereof.

As the carbonic ester compound, there may be mentioned diallyl carbonates such as diphenyl carbonate, and dialkyl carbonates such as dimethyl carbonate and diethyl carbonate.

The PC oligomer used for the preparation of the polycarbonate-polyorganosiloxane copolymer may be a homopolymer using one of the above-described dihydric phenols or a copolymer using two or more thereof.

Further, the oligomer may be a thermoplastic random branched polycarbonate obtainable by using the above dihydric phenol with a polyfunctional aromatic compound.

In this case 1,1,1-tris(4-hydroxyphenyl)ethane, α, α', α''-tris(4-hydroxyphenyl)-1,3,5-triisopropylbenzene, 1-[α-methyl-α-(4'-hydroxyphenyl)ethyl]-4-[α',α'-bis(4''-hydroxyphenyl)ethyl]benzene, phloroglucin, trimellitic acid or isatinbis(o-cresol) may be used as the branching agent (polyfunctional aromatic compound).

The polycarbonate-polyorganosiloxane copolymer of component (a-1) can be prepared in the manner as described above. In this case, an aromatic polycarbonate is generally by produced and an aromatic polycarbonate containing the polycarbonate-polyorganosiloxane copolymer is produced.

The polymer produced by the above method substantially has the aromatic terminal group represented by the above general formula (1) at one or both ends of the molecule.

The content of the polyorganosiloxane segment in the polycarbonate-polyorganosiloxane copolymer, which has the terminal group represented by the general formula (1), is 0.1 to 4 mass %, preferably 0.3 to 2 mass % of the copolymer.

When the content of the polyorganosiloxane segment is within a range from 0.1 to 4 mass %, a good flame retardancy and impact resistance property can be obtained without compromising the innate characteristics of polycarbonate resins.

Further, when the content of the polyorganosiloxane segment is within the range above, a sufficient compatibility with aromatic polycarbonate (a-2) can be obtained.

The particularly preferred polyorganosiloxane segment is a polydimethylsiloxane (PDMS).

In the polycarbonate resin composition according to the present invention, an aromatic polycarbonate (a-2) as another component of the component (A) has a terminal group presented by the general formula (6):

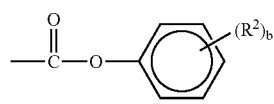
(6)

(In the formula (6), $R^2$ represents an alkyl group having 1 to 35 carbon atoms and the symbol b is an integer of 0 to 5.)

The aromatic polycarbonate normally has a viscosity-average molecular weight of 10,000 to 40,000, preferably 14,000 to 25,000 from the viewpoints of flame retardancy, fluidity and mechanical properties, and more preferably 15,000 to 25,000.

In the general formula (6), $R^2$ represents an alkyl group which has 1 to 35 carbon atoms and may have a straight chain or branched structure.

The bonding position may be p-, m-, or o-position, but p-position is preferable.

The aromatic polycarbonate, which has the terminal group presented by the general formula (6), can be easily produced by reacting a dihydric phenol with a phosgene or carbonic ester compound.

Namely, the aromatic polycarbonate may be produced, for example, by a reaction of a dihydric phenol with a carbonate precursor such as phosgene or by an ester exchange reaction of a dihydric phenol with a carbonate precursor such as diphenyl carbonate, in a solvent such as methylene chloride and in the presence of a catalyst such as triethylamine and a specific terminating agent.

The dihydric phenol may be the same compound as that represented by the general formula (5) or may be different from that.

Also usable may be a homopolymer using one of the above-described dihydric phenols or a copolymer using two or more of the dihydric phenols.

Further, a thermoplastic random branched polycarbonate obtained by using the above-described dihydric phenol together with a polyfunctional aromatic compound may be used.

As the carbonic ester compound, there may be mentioned diaryl carbonates such as diphenyl carbonate, and dialkyl carbonates such as dimethyl carbonate and diethyl carbonate.

As the terminating agent, a phenol compound which forms the terminal group represented by the general formula (6) may be used.

Namely, the terminating agent is a phenol compound represented by the general formula (7) and $R^2$ has the same meaning as that in the general formula (6).

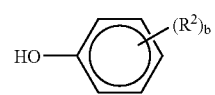
(7)

As the phenol compound, the same examples of phenol compounds for the general formula (4) may be mentioned. For example, phenol, p-cresol, p-tert-butylphenol, p-tert-octylphenol, p-cumylphenol, p-nonylphenol, p-tert-amylphenol, bromophenol, tribromophenol and pentabromophenol may be specifically mentioned.

Above all, halogen-free compounds are preferable from the standpoint of environmental problems.

The aromatic polycarbonate obtainable by the above method substantially has the terminal group represented by the general formula (6) at one or both ends of the molecule.

In the polycarbonate of the component (A) according to the present invention, the content of the polycarbonate-polyorganosiloxane copolymer (a-1), which has the terminal group represented by the general formula (1), is 10 to 100 mass %, preferably 20 to 90 mass %.

When the content is 10 mass % or higher, flame retardancy and impact strength will be improved.

In the polycarbonate of the component (A) according to the present invention, the content of the aromatic polycarbonate (a-2) is 90 to 0 mass %, preferably 80 to 10 mass %.

When the aromatic polycarbonate exists in the polycarbonate of the component (A), impact strength and heat resistance will be improved.

The polycarbonate of the component (A) has a viscosity-average molecular weight of 10,000 to 40,000, preferably 12,000 to 30,000.

In the polycarbonate resin composition according to the present invention, as the fatty acid polyester of the component (B), a polylactic acid or a copolymer of hydroxycarboxylic acid and lactic acid may preferably be used.

Polylactic acid is synthesized by ring-opening polymerization from cyclic dimer of lactic acid, which is normally called as lactide, and the methods of its preparation are disclosed by U.S. Pat. Nos. 1,995,970, 2,362,511, 2,683,136, etc.

Copolymers of lactic acid and other hydroxycarboxylic acids are normally synthesized by ring-opening polymerization from cyclic ester intermediates of lactide and hydroxycarboxylic acids and the methods of their preparation are disclosed by U.S. Pat. Nos. 3,635,956, 3,797,499, etc.

When a lactic acid resin is produced by direct dehydration polycondensation rather than by ring-opening polymerization, a lactic acid resin with a suitable degree of polymerization for the present invention can be obtained by azeotropic dehydration condensation of lactic acids and, if necessary, other hydroxycarboxylic acids, in the presence of, preferably an organic solvent, particularly a phenyl ether solvent, and more preferably by removing water from the solvent azeotrope after azeotropic distillation and by returning the solvent, which contains substantially no water, to the reaction system.

The lactic acids as raw materials may be L- and D-lactic acid, their mixtures, or lactide, which is a dimer of lactic acid.

As the other hydroxycarboxylic acids which can be used in combination with lactic acids, there may be mentioned glycolic acid, 3-hydroxybutyric acid, 4-hydroxybutyric acid, 4-hydroxyvaleric acid, 5-hydroxyvaleric acid, 6-hydroxycaproic acid, etc. and, further may be cyclic ester intermediates of hydroxycarboxylic acids such as glycolide, which is a dimer of glycolic acid, and ε-caprolacton, which is a cyclic ester of 6-hydroxycaproic acid may also be used.

When producing a lactic acid resin, a suitable molecular weight controlling agent, chain branching agent and other modifying agent may be added.

The lactic acids and the hydroxycarboxylic acids as copolymer components may be used singularly or plurally and, further, the obtained lactic acid resins may be used in combination of two or more thereof.

As the fatty acid polyester of the component (B) according to the present invention, polylactic acid, which has excellent fluidity, thermal and mechanical properties, and large molecular weight, is preferable, and polylactic acid with an average molecular weight of 30,000 or more is more preferable.

The content of the fatty acid polyester of the component (B) is 5 to 100 mass parts, preferably 10 to 50 mass parts, for 100 mass parts of the polycarbonate of the component (A).

When the content of the fatty acid polyester is 5 mass parts or more, the resin composition exhibits good fluidity, and when the content is 100 mass parts or less, it has good flame retardancy.

Additionally, for the polycarbonate resin composition according to the present invention, an inorganic filler (C), flame retardant (D) and fluorocarbon resin (E) may be added as needed.

As the inorganic filler of the component (C) according to the present invention, talc, mica, kaolin, diatomite, calcium carbonate, calcium sulfate, barium sulfate, glass fibers, carbon fibers, potassium titanate, etc. may be used.

Among all the inorganic fillers, talc and mica are especially preferable because they are in the form of plates.

Talc is hydrous silicate of magnesium and is generally available in the market.

The talc with an average particle diameter of 0.1 to 50 μm may be used, but the talc with an average particle diameter of 0.2 to 20 μm is especially preferable.

Since the inorganic filler is added to improve rigidity and flame retardancy, platy talc is preferable.

The amount of addition of inorganic filler (C) is 40 mass parts or less, preferably 1 to 20 mass parts, more preferably 2 to 15 mass parts, to 100 mass parts of the polycarbonate of the component (A).

As the flame retardant of the component (D) according to the present invention, there may be mentioned organic alkali metal salt, organic alkaline earth metal salt and phosphate ester compounds.

As the organic alkali metal salt and organic alkaline earth metal salt, various organic salts may be usable, and alkali metal salt and alkaline earth metal salt of organic acid or organic acid ester having at least one carbon atom may be mentioned.

Where, the organic acid or organic acid ester is organic sulfonic acid, organic carboxylic acid, etc.

On the other hand, the alkali metal includes sodium, potassium, lithium and cesium, and the alkaline earth metal include magnesium, calcium, strontium and barium.

Above all, salt of sodium, potassium or cesium is preferably used.

The salt of organic acid may be substituted with halogen such as fluorine, chlorine and bromine.

Among the above-described various organic alkali metal salt and organic alkaline earth metal salt, in the case of organic sulfonic acid, for example, alkali metal salt and alkaline earth metal salt of perfluoroalkanesulfonic acid represented by the following general formula (8) are preferably used:

$$(C_nF_{2n+1}SO_3)_mM \qquad (8)$$

(In the formula (8), n is an integer of 1 to 10 and the symbol M represents alkali metal, such as lithium, sodium, potassium and cesium, or alkaline earth metal salt, such as magnesium, calcium, strontium and barium, and the symbol m represents the atomic valence of M.)

In the above general formula (8), the examples of such perfluoroalkanesulfonic acid may include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid and perfluorooctanesulfonic acid.

Above all, potassium salt of these acids is preferably used.

In addition to them, alkali metal salt and organic alkaline earth metal salt of organic sulfonic acid, such as 2,5-dichlorobenzenesulfonic acid; 2,3,5-trichlorobenzenesulfonic acid; diphenylsulfone-3-sulfonic acid; diphenylsulfone-3,3'-disulfonic acid; naphthalene trisulfonic acid; polystyrene sulfonic acid, may be mentioned.

Additionally, as the organic carboxylic acid, for example, perfluoroformic acid, perfluoroalkanesulfonic acid may include perfluoromethanecarboxylic acid, perfluoroethanecarboxylic acid, perfluoropropanecarboxylic acid, perfluorobutanecarboxylic acid, perfluoromethylbutanecarboxylic acid, perfluorohexanecarboxylic acid, perfluoroheptanecarboxylic acid and perfluorooctanecarboxylic acid may be mentioned.

The alkali metal salt and organic alkaline earth metal salt are the same as above.

halogen-free compounds are preferable and an example is represented by the following general formula (9):

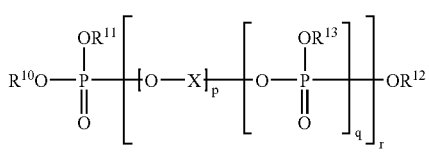

(9)

(wherein $R^{10}$, $R^{11}$, $R^{12}$ and $R^{13}$ respectively and independently represent a hydrogen atom or organic group, the symbol X represents an organic group having two or more hydroxyl groups, the symbol p is 0 or 1, the symbol q is an integer of 1 or greater, and the symbol r is an integer of 0 or greater.)

In the general formula (9), the organic group may or may not be substituted with an alkyl group, cycloalkyl group, aryl group, etc.

When the organic group is substituted, the substituent may be an alkyl group, alkoxy group, aryl group, aryloxy group, arylthio group, etc.

The substituent may also be a group such as an arylalkoxyalkyl group which is obtained by combining the above substituents or a group such as an arylsulfonylaryl group which is obtained by combining the above substituents through an oxygen atom, nitrogen atom, sulfur atom, etc.

In the general formula (9), the organic group X having two or more hydroxyl groups is a group, having two or more hydroxyl groups, which is obtained by removing one or more hydrogen atom(s) bonded to a carbon atom from the above described organic groups.

For example, an alkylene group, a (substituted) phenylene group and a group derived from bisphenol which is polynuclear phenol.

The preferable organic groups include bisphenol A, hydroquinone, resorcinol, dihydroxydiphenyl and dihydroxynaphthalene, for example.

The phosphate ester compounds may be a monomer, oligomer, polymer or their mixtures.

Specific examples include trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl)phosphate, diisopropylphenyl phosphate, trixylenyl phosphate, tris(isopropylphenyl)phosphate, trinaphthyl phosphate, bisphenol A bisphosphate, hydroquinone bisphosphate, resorcin bisphosphate, resorcinol-diphenyl phosphate, trioxybenzene triphosphate, and their substituted forms and condensates.

Among all the above examples, however, there are some cases where it is preferable to use a compound which is mainly consist of a phosphate ester compound in which the r shown in the above general formula (9) is 1 or more, or to use a compound in which a part of phenol group is substituted with an alkyl group, etc. from the viewpoints of mold adherability during molding and heat and moisture resistance of molded articles.

Where, commercially available halogen-free phosphate ester compounds include, for example, TPP (triphenyl phosphate), TXP (trixylenyl phosphate), CR-733S (resorcinol bis (diphenylphosphate)), PX200 (1,3-phenylene-tetraquis (2,6-dimethylphenyl)phosphate ester)), PX201 (1,4-phenylene-tetraquis(2,6-dimethylphenyl)phosphate ester), PX202 (4,4'-biphenylene-tetraquis)2,6-dimethylphenyl)phosphate) and CR741 (bisphenol A bis(diphenylphosphate)) by Daihachi Chemical Industry Co., Ltd.

The flame retardant (D) may be used singly or may be used in combination of two or more thereof.

The amount of addition of flame retardant (D) is 15 mass parts or less for 100 mass parts of the polycarbonate of the component (A) and, in the cases of organic alkali metal salt and/or organic alkaline earth metal salt, the amount is preferably 0.05 to 1 mass parts, more preferably 0.1 to 1 mass parts.

In the case of phosphate ester compound, the amount is preferably 0.5 to 15 mass parts, more preferably 3 to 12 mass parts.

The fluorocarbon resin of the component (E) according to the present invention is used for the purpose to prevent the dripping of molten resin during combustion in a flame retardancy test, etc.

The fluorocarbon resin is normally a polymer or copolymer containing a fluoroethylene structure, examples of which include difluoroethylene polymer, tetrafluoroethylene polymer, tetrafluoroethylene-hexafluoropropylene copolymer, copolymers of tetrafluoroethylene and an ethylene monomer not containing fluorine.

Polytetrafluoroethylene (PTFE) is preferable and its average molecular weight is preferably 500,000 or more, particularly preferably 500,000 to 10,000,000.

All known types of polytetrafluoroethylene can be used as the fluorocarbon resin for the present invention.

Additionally, among these fluorocarbon resins, even greater prevention of dripping of molten resin can be imparted if a fluorocarbon resin having an ability to form fibrils is used.

There is no particular limitation on the polytetrafluoroethylene (PTFE) having an ability to form fibrils and examples may include those that are classified as Type 3 according to ASTM standard.

Specific examples may include Teflon 6-J (Mitsui-Dupont Fluorochemical Company, Ltd), POLYFLON D-1, POLYFLON F-103, POLYFLON F201 (Daikin Industries Co., Ltd) and CD076 (Asahi-ICI Fluoropolymers Co., Ltd.).

In addition to those classified into the above-mentioned Type 3, other examples may include Argoflon F5 (Montefluos Co, Ltd.), POLYFLON MPA and POLYFLON FA-100 (Daikin Industries Co., Ltd).

These polytetrafluoroethylenes (PTFE) may be used singly or in combination of two or more thereof.

The above-mentioned polytetrafluoroethylenes (PTFE) having an ability to form fibrils can be obtained by, for example, polymerizing tetrafluoroethylene in an aqueous solvent in the presence of sodium, potassium and ammonium peroxidisulfide at a pressure of 7 to 700 kPa and temperature of 0 to 200 degrees C., and preferably 20 to 100 degrees C.

The amount of addition of fluorocarbon resin (E) is 5 mass parts or less, preferably 0.01 to 2 mass parts, for 100 mass parts of the polycarbonate of the component (A).

If the amount of addition of fluorocarbon resin (E) is equal to or more than 0.01 mass parts, the performance to prevent the dripping of molten resin will be sufficient for the target flame retardancy, and if the amount is equal to or less than 5 mass parts, the improvement of effect in flame retardancy will be appropriate for the amount (specifically, high flame retardancy of V-1, V-0, or 5V) and the impact resistance and appearance of molded articles will be good.

Therefore, the amount can be suitably determined in consideration of the other components used and according to the required degree of flame retardancy, for example, V-1, V-1, V-2, etc. of UL-94.

The present invention also provides molded articles made of the above described polycarbonate resin composition.

The polycarbonate resin composition according to the present invention can be obtained by blending and kneading the above-mentioned components (A), (B) and, if necessary, (C), (D) (E) and, other components if necessary.

The blending and kneading may be carried out with a generally employed method, for example, by using a ribbon blender, Henschel mixer, Banbury mixer, drum tumbler, single-screw extruder, double-screw extruder, cokneader, multi-screw extruder, etc.

The kneading temperature of the blended compounds is generally selected from the range of 240 to 320 degrees C.

EXAMPLES

The present invention will be described more concretely below with reference to Examples. However, the present invention is not restricted to these Examples in any way.

Examples 1 to 7 and Comparative Examples 1 to 4

The components (A) to (E) were blended in the ratio shown in Table 1, fed into a vented double-screw extruder (Model name: TEM35, manufactured by Toshiba Machine Co., Ltd.), melted and kneaded at 260 degrees C. therein, and then pelletized.

In all the Examples and Comparative Examples, 0.1 mass parts of phosphorus antioxidant (Product name: PEP36, manufactured by ADECA Corporation (former Asahi Denka Industries Co., Ltd.)) and 0.1 mass parts of phenol antioxidant (Product name: IRGANOX 1076, manufacturer: Ciba Specialty Chemicals) were added to a total of 100 mass parts of the components (A) to (E) as stabilizing agents.

The resulting pellets were dried at 80 degrees C. for 10 hours and test pieces using the resin compositions of Examples and Comparative Examples were obtained by injection molding at 260 degrees C. (Mold temperate of 80 degrees C.).

These test pieces were tested for their properties in the following various evaluation tests.

The evaluation results are shown in Table 1.

[Component Blend]

The following component blend was used for Examples 1 to 7 and Comparative Examples 1 to 4.

Component (A)

Component (a-1)

PC-1: Polycarbonate-polydimethylsiloxane (PDMS) bisphenol A polycarbonate [MI=45 g/10 min. (at 300 degrees C., under a load of 1.2 kg), Viscosity-average molecular weight=20,000, PDMS content: 4% by mass, PDMS chain length (n)=30]

Component (a-2)

PC-2: Bisphenol A polycarbonate [Product name: FN1700A, manufactured by Idemitsu Kosan Co., Ltd. (former Idemitsu Petrochemical Co., Ltd.), Viscosity-average molecular weight=17,500]

Component (B)

PLA: Polylactic acid (Product name: H100, manufactured by Mitsui Chemicals, Inc.)

Component (C)

Talc (Product name: TP-A25, manufactured by Fuji Talc Industrial CO., LTD., Average particle diameter=4.9 μm)

Component (D)

Salt metal: Potassium perfluorobutanesulfonate (Product name: Megaface F-114, manufactured by Dainippon Ink And Chemicals, Incorporated)

Phosphate ester: Bisphenol A bis(diphenylphosphate) (Product name: CR741, manufactured by Daihachi Chemical Industry Co., Ltd.)

Component (E)

PTFE: Polytetrafluoroethylene (Product name: CD076, manufactured by Asahi-ICI Fluoropolymers Co., Ltd.)

[Performance Evaluation Method]

(1) Fluidity (Spiral flow length: SFL): Measured as a molding temperature of 260 degrees C., mold temperate of 80 degrees C., wall thickness of 2.0 cm, width of 10 mm and injection pressure of 7.8 MPa. (unit: cm)

(2) Flame retardancy: In conformity with the UL94 (Test piece thickness: 1.5 and 3.0 mm)

Vertical flame tests were conducted in conformity with the Underwriters Laboratories subject 94.

TABLE 1-1

|  |  |  |  | Example | | | | | | |
|---|---|---|---|---|---|---|---|---|---|---|
|  |  |  |  | 1 | 2 | 3 | 4 | 5 | 6 | 7 |
| Blending Ratio | (A) | (a-1) | PC-1 (mass part) | 37 | 22 | 22 | 89 | 89 | 89 | 100 |
|  |  | (a-2) | PC-2 (mass part) | 63 | 78 | 78 | 11 | 11 | 11 | 0 |
|  | (B) |  | PLA (mass part) | 5.3 | 11 | 11 | 11 | 11 | 11 | 100 |
|  | (C) |  | Talc (mass part) | 5.3 | 11 | 11 | 0 | 11 | 11 | 40 |
|  | (D) |  | Metal salt (mass part) | 0 | 0.1 | 0 | 0 | 0 | 0 | 0 |

TABLE 1-1-continued

|  |  |  | Example | | | | | | |
| --- | --- | --- | --- | --- | --- | --- | --- | --- | --- |
|  |  |  | 1 | 2 | 3 | 4 | 5 | 6 | 7 |
|  |  | Phosphate ester (mass part) | 0 | 0 | 15 | 0 | 0 | 0 | 0 |
|  | (E) | PTFE (mass part) | 0.32 | 0.32 | 0.32 | 0.32 | 0 | 0.32 | 0.6 |
| Rating | Fluidity | SFL (260° C., 2 mm thickness) (cm) | 22 | 30 | 60 | 26 | 30 | 30 | 70 |
|  | Flame retardancy | 1.5 mm (UL94) | V-1 | V-1 | V-0 | V-2 | V-2 | V-1 | — |
|  |  | 3.0 mm (UL94) | V-0 | V-1 | V-0 | V-2 | V-2 | V-0 | V-2 |

TABLE 1-2

|  |  |  |  | Comparative Example | | | |
| --- | --- | --- | --- | --- | --- | --- | --- |
|  |  |  |  | 1 | 2 | 3 | 4 |
| Blending Ratio | (A) | (a-1) | PC-1 (mass part) | 0 | 35 | 0 | 67 |
|  |  | (a-2) | PC-2 (mass part) | 100 | 65 | 100 | 33 |
|  | (B) |  | PLA (mass part) | 0 | 1 | 11 | 122 |
|  | (C) |  | Talc (mass part) | 0 | 5.1 | 0 | 0 |
|  | (D) |  | Metal salt (mass part) | 0 | 0 | 0 | 0 |
|  |  |  | Phosphate ester (mass part) | 0 | 0 | 0 | 0 |
|  | (E) |  | PTFE (mass part) | 0.3 | 0.3 | 0.33 | 0 |
| Rating | Fluidity |  | SFL(260° C., 2 mm thickness) (cm) | 18 | 18 | 26 | 80 |
|  | Flame retardancy |  | 1.5 mm(UL94) | V-2 | V-1 | — | — |
|  |  |  | 3.0 mm(UL94) | V-2 | V-1 | V-2out | V-2out |

Table 1 proves the following:

(1) For Examples 1 to 7, their fluidity was improved by adding polylactic acid as the component (B) to polycarbonate of the component (A), and their flame retardancy was improved by using talc of the component (C), metal salt and phosphate ester of the component (D) and PTFE of the component (E).

(2) For Comparative Examples 1 and 2, their fluidity improving effect was low when the amount of addition of polylactic acid was equal to or less than 1 mass parts for 100 mass parts of the component (A).

(3) For Comparative Examples 3, the flame retardancy was poor when PC-1 of component (a-1) was not used.

(4) For Comparative Examples 4, the flame retardancy was deteriorated when the amount of addition of polylactic acid of the component (B) was 122 mass parts for 100 mass parts of the component (A).

INDUSTRIAL APPLICABILITY

According to the present invention, a high fluidity of a polycarbonate resin composition can be achieved by adding a fatty acid polyester and, at the same time, a high flame retardancy of the composition can also be obtained by using a polycarbonate-polyorganosiloxane copolymer, therefore, the polycarbonate resin composition according to the present invention can be used in the field of electric and electronics equipment including office automation equipment, information and communication equipment and electric home appliances, and in the fields of automotive and construction.

The invention claimed is:

1. A polycarbonate resin composition comprising:
   (A) 100 mass parts of a polycarbonate component, comprising 20-90% by mass of (a-1) a polycarbonate-polyorganosiloxane copolymer and 80-10% by mass of (a-2) an aromatic polycarbonate; and
   (B) 10-50 mass parts of a fatty acid polyester component selected from the group consisting of a polylactic acid and a copolymer of hydroxycarboxylic acid and lactic acid.

2. The polycarbonate resin composition as defined in claim 1, wherein the viscosity-average molecular weight of the component (A) is 10,000-40,000.

3. The polycarbonate resin composition as defined in claim 1, wherein the polyorganosiloxane segment of the polycarbonate-polyorganosiloxane copolymer (a-1) is a polydimethylsiloxane.

4. The polycarbonate resin composition as defined in claim 1, wherein the fatty acid polyester component (B) is a polylactic acid.

5. The polycarbonate resin composition as defined in claim 1, further comprising a filler (C) in an amount of 1-40 mass parts to 100 mass parts of polycarbonate component (A).

6. The polycarbonate resin composition as defined in claim 1, further comprising a flame retardant (D) in an amount of 0.05-15 mass parts to 100 mass parts of polycarbonate component (A).

7. The polycarbonate resin composition as defined in claim 1, further comprising a fluorocarbon resin (E) in an amount of 0.01-5 mass parts to 100 mass parts of polycarbonate component (A).

8. Office automation equipment, information and communication equipment, or electric home appliances comprising a polycarbonate resin composition as defined in claim 1.

9. A molded article comprising the polycarbonate resin composition as defined in claim 1.

10. The polycarbonate resin composition as defined in claim 1, wherein the fatty acid polyester component (B) is a copolymer of hydroxycarboxylic acid and lactic acid.

11. The polycarbonate resin composition as defined in 1, wherein the polycarbonate-polyorganosiloxane copolymer (a-1) has a terminal group presented by formula (1):

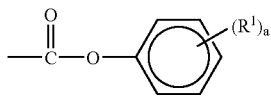

where $R^1$ represents an alkyl group having 1 to 35 carbon atoms and a is an integer of 0 to 5.

12. The polycarbonate resin composition as defined in claim 11, wherein the content of the polyorganosiloxane segment in the polycarbonate-polyorganosiloxane copolymer is 0.1 to 4 mass % of the copolymer.

13. The polycarbonate resin composition as defined in claim 11, wherein the content of the polyorganosiloxane segment in the polycarbonate-polyorganosiloxane copolymer is 0.3 to 2 mass % of the copolymer.

14. The polycarbonate resin composition as defined in claim 1, wherein the polycarbonate-polyorganosiloxane copolymer (a-1) has a polycarbonate segment with a structural unit represented by formula (2) and a polyorganosiloxane segment with a structural unit represented by formula (3):

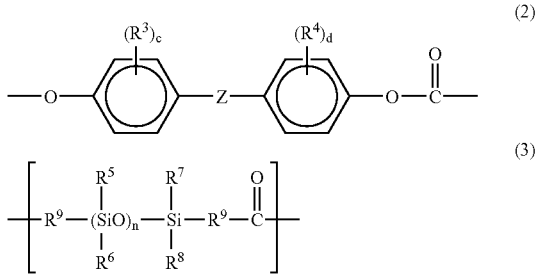

where, $R^3$ and $R^4$, which may be the same or different from one another, represent an alkyl or phenyl group having 1 to 6 carbon atoms, $R^5$ to $R^8$, which may be the same or different from one another, represent an alkyl or phenyl group having 1 to 6 carbon atoms, $R^9$ represents a divalent organic residue containing an aliphatic or aromatic group, Z represents a single bond, an alkylene group having 1 to 20 carbon atoms, an alkylidene group having 1 to 20 carbon atoms, a cycloalkylene group having 5 to 20 carbon atoms, a cycloalkylidene group having 5 to 20 carbon atoms, or a bond of —SO$_2$—, —SO—, —S—, —O— or —CO—, c and d each independently represent an integer of 0 to 4, and n is an integer of 1 to 500.

15. The polycarbonate resin composition as defined in claim 1, wherein the aromatic polycarbonate (a-2) is present and has a terminal group presented by formula (6):

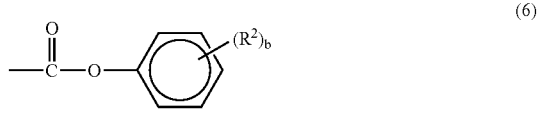

where $R^2$ represents an alkyl group having 1 to 35 carbon atoms and b is an integer of 0 to 5.

16. The polycarbonate resin composition as defined in claim 1, wherein the fatty acid polyester component (B) is a copolymer of hydroxycarboxylic acid and lactic acid and wherein said hydroxycarboxylic acid is selected from the group consisting of glycolic acid, 3-hydroxybutyric acid, 4-hydroxybutyric acid, 4-hydroxyvaleric acid, 5-hydroxyvaleric acid, and 6-hydroxycaproic acid.

17. The polycarbonate resin composition as defined in claim 14, wherein the fatty acid polyester component (B) is a polylactic acid.

18. The polycarbonate resin composition as defined in claim 14, wherein the fatty acid polyester component (B) is a copolymer of hydroxycarboxylic acid and lactic acid and wherein said hydroxycarboxylic acid is selected from the group consisting of glycolic acid, 3-hydroxybutyric acid, 4-hydroxybutyric acid, 4- hydroxyvaleric acid, 5-hydroxyvaleric acid, and 6-hydroxycaproic acid.

19. The polycarbonate resin composition as defined in claim 14, wherein the polyorganosiloxane segment of the polycarbonate-polyorganosiloxane copolymer (a-1) is a polydimethylsiloxane.

* * * * *